May 20, 1924.
E. R. BRIGGS
1,494,662
AGRICULTURAL IMPLEMENT MOTOR TRUCK
Filed March 22, 1923
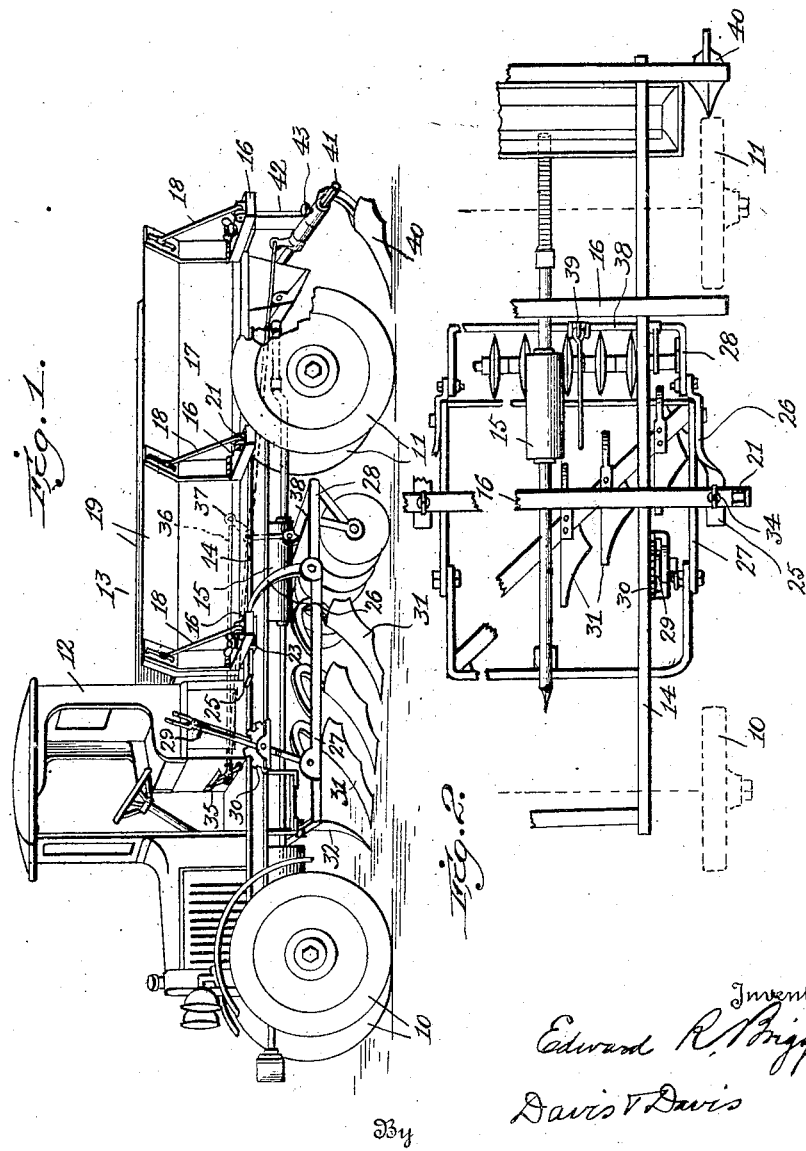

Patented May 20, 1924.

1,494,662

UNITED STATES PATENT OFFICE.

EDWARD R. BRIGGS, OF BERKELEY, CALIFORNIA.

AGRICULTURAL-IMPLEMENT MOTOR TRUCK.

Application filed March 22, 1923. Serial No. 626,891.

*To all whom it may concern:*

Be it known that I, EDWARD R. BRIGGS, a citizen of the United States of America, and a resident of Berkeley, county of Alameda, and State of California, have invented certain new and useful Improvements in Agricultural-Implement Motor Trucks, of which the following is a full and clear specification.

This invention relates to improvements in implement motor trucks and has for its particular object to provide a truck of this character which is constructed in a manner to readily receive or have attached thereto said working implements of various types.

This object and others hereinafter set forth are attained by the means illustrated in the accompanying drawings, in which—

Fig. 1 is a perspective view of the improved truck having several implements attached thereto;

Fig. 2 is a partial plan view of the chassis of the truck showing the wheels in dotted lines.

Similar reference numerals in all of the figures of the drawing designate like parts.

The truck shown in the drawing is of the commercial type provided with front-wheels 10, rear-wheels 11, cab 12, box-body 13, longitudinal chassis-beams 14, muffler 15, and the usual steering mechanism.

Box-body 13 is supported on a plurality of cross-body sills or beams 16 and the ends of these cross body-sills or separate beams are extended a sufficient distance beyond the side-boards 17 of the box-body to form suitable supports for certain agricultural implements and braces 18 for the side-boards. Side-boards 17 are hinged at their lower edges, preferably to the cross body-sills or beams 16 and are preferably provided with flaring top edges 19.

On the underside of each extended end of the cross-beam located adjacent to the rear side of the cab 12 is secured a clamping-plate 23 which is provided with a recess 24 adapted to receive the upper and horizontal angular end 25 of a hanger 26, the lower end of which is pivotally attached to a plow-frame 27 and also to a disk-harrow frame 28. The plow frame 27 is adjustably supported at its front end preferably by a hand-lever 29, and said hand-lever is provided with a latch adapted to engage in the notches of a toothed segment 30 rigidly fixed to the side of the chassis frame. Thus by operating the hand-lever 29, which is accessible from the driver's seat, the plows 31 can be lowered or raised as desired. A center cutter blade 32 can be used if desired. The hangers 26 are rigidly retained in position by the bolts 33 which extend through the clamping-plates, ends of the hangers and also the cross-beam, and thumb-nuts 34 are used to tighten the connection.

It is desirable also to provide means for raising and lowering the harrow-frame 28. Said means preferably consist of a foot-lever 35 located in the cab, a rod 36 connected thereto and to a pivoted angle-lever 37 having its lower end pivotally connected to the rear-bar 38 of the harrow-frame as shown at 39 in Fig. 2.

Thus it is obvious that the driver of the truck can raise or lower the harrow by operating the foot-lever 35.

From the above-described construction, it will be seen that the plows are suspended in a manner to plow the space underneath the truck and between the wheels, thereby leaving traction for the rear-wheels on level or unbroken ground. For the purpose of plowing the ground behind the two rear-wheels of the truck, plows 40 are provided which are adjustably mounted on a cross-rod 41 that is rigidly suspended by hangers 42 from the rear cross-beam 16. The plow-beams of these plows 40 are preferably mounted on the rod or bar 41 outside of the bearing of the hanger 42, so that they can be adjusted laterally on said rod 41 to vary the space between the rear plows, and can be easily slipped off or on without disturbing the hangers. These plows can be adjusted around said supporting rod 41 and be held in adjusted positions by suitable set-screws 43.

From the above, it will be observed that a motor truck has been utilized to furnish the motive power for the operation of a series of agricultural implements, whereby the farm work can be done in a better and quicker manner than is usual when done with different implements going separately over the same ground. It will be further observed that the manner of attaching the implements to the extended ends of the cross-beams facilitates the connecting of these implements to the truck and avoids any work beneath the truck in order to do the connecting.

It will be understood that it is also my purpose to provide means whereby any one of the commercial motor trucks now on the market may be adapted for use as a general agricultural implement for farm use, the agricultural devices being so attached to the truck that they may be readily disconnected therefrom and laid aside, so that the truck may be used in the usual way for usual purposes. To thus convert a motor truck chassis to a farm truck or implement, I mount the body or box upon cross-sills which are long enough to project beyond the side-beams of the chassis, and these projecting ends of the cross-sills are used for two purposes: first, to afford supports for the hinged braces on the side boards of the box, thus permitting these side boards to be tilted outwardly to enlarge the capacity of the box for use in hauling all kinds of products; and, secondly, to provide supports for the soil-working implements. By thus attaching the soil-working implements to the extended ends of the cross-sills, it will be observed that I not only avoid the necessity of providing special clamping means for attaching them to the truck chassis, but I also locate the attaching means in such position that the soil-working implements may be readily attached and detached without getting under the truck. It will be understood also that the devices for raising and lowering the soil-working implements may be greatly varied without departing from the spirit of my invention.

What I claim is:

An agricultural-implement motor-truck embodying a chassis adapted to support a box-body comprising longitudinal beams mounted between the wheels in a plane above the hubs of the wheels, a plurality of transverse body-supporting sills supported by said longitudinal beams, the ends of which project outwardly beyond and substantially in the same horizontal plane with said longitudinal beams on both sides of the truck, an agricultural implement lying under the chassis and between the wheels of the truck, and means whereby this implement is detachably supported on both projecting ends of one of the body-supporting sills.

In testimony whereof I hereunto affix my signature.

EDWARD R. BRIGGS.